United States Patent [19]
Ishigaki

[11] Patent Number: 4,919,775
[45] Date of Patent: Apr. 24, 1990

[54] METHOD AND APPARATUS FOR ELECTROLYTIC TREATMENT OF SLUDGE

[75] Inventor: Eiichi Ishigaki, Sakaide, Japan

[73] Assignee: Ishigaki Kiko Co., Ltd., Tokyo, Japan

[21] Appl. No.: 242,136

[22] Filed: Sep. 9, 1988

[30] Foreign Application Priority Data

Sep. 28, 1987 [JP] Japan ................... 62-245219

[51] Int. Cl.⁵ ..................... C02F 1/00; C02F 11/00
[52] U.S. Cl. .................... 204/149; 210/748; 204/269
[58] Field of Search ............ 204/149, 269, 237; 210/608, 703, 748

[56] References Cited

U.S. PATENT DOCUMENTS

| | | | |
|---|---|---|---|
| 3,056,749 | 9/1957 | Griffith | 210/608 |
| 4,062,754 | 12/1977 | Eibl | 204/269 |
| 4,179,347 | 12/1979 | Krause et al. | 204/149 |

Primary Examiner—John F. Niebling
Assistant Examiner—Arun S. Phasge

[57] ABSTRACT

A multiplicity of electrode plates, anodic and cathodic, are alternately arranged in an electrolytic tank side by side at short intervals in a row. A circulating current of the sludge being treated is caused to be produced within said electrolytic tank. Said circulating current including an upward current flowing upward between individual electrode plates and a surface current flowing above the row of the electrode plates and near the surface level of the sludge in a specified direction. Gas bubbles produced between the individual electrode plates and flocs present between the electrode plates are carried to the surface of the tank by said upward current. The surfaced bubbles and flocs being then carried by said surface current to a location which is generally outside the surface area above the elecrode plates. Air bubbles thus collected at one side of the electrolitic tank are beaten out by a shower of sludge falling thereon.

4 Claims, 5 Drawing Sheets

METHOD AND APPARATUS FOR ELECTROLYTIC TREATMENT OF SLUDGE

BACKGROUND OF THE INVENTION

1. Industrial Fields of the Invention

The present invention relates to a method and apparatus for electrolytic treatment of less filterable sludge produced at a sewage and/or night soil treatment plant or the facility in order to modify same into an easily filterable type of sludge before it is subjected to filtration.

2. Prior Art and its Problems

Various types of sludge, such as raw sludge, digested sludge, excess sludge, and mixed sludge, produced in large quantities at a sewage and/or night soil treatment plant are first dewatered by means of a dehydrator, such as vacuum dehydrator, belt-type press, or filter press, and the dewatered sludge is then subjected to incineration or landfill disposal, or used for fertilization.

However, these types of sludge contain organic or inorganic particulate matter of highly hydrophillic nature and colloidal powder in large proportions, and further they have a large amount of organic matter dissolved or suspended therein; therefore they are very highly viscous and, insofar as they remain as such, it is very difficult to dehydrate them by aforesaid dehydrator.

As such, it is general practice in the prior art to add in and mix with the sludge prior to dehydration such inorganic flocculants as ferric chloride, green vitriol, and polyaluminum chloride, or such organopolymeric flocculants as polyacrylamide and formaldehyde condensates, or to further add and mix filter aids, such as slaked lime and diatomaceous earth, thereby adjusting and modifying the configuration of the sludge so as to facilitate dehydration by any such dehydrator as above mentioned. The modified sludge is then filtered and dewatered by means of the dehydrator.

As an alternative practice, it has also been known in the art to modify the sludge prior to dehydration by subjecting same to electrolytic treatment in an electrolytic tank (as disclosed in, for example, Japanese Patent Publication No. 16351/1979, and Japanese Patent Laid-Open Publication Nos. 105800/1981 and 129199/1987).

However, the first mentioned method of modifying the sludge prior to dehydration by adding chemical agents thereto involves various problems. One problem is that addition of large amounts of flocculants and filter aids into the sludge is inconvenient from the standpoint of filter maintenance. Another problem is that such addition results in increased cake production (e.g., where filter aids are used, the resulting cake production will be as high as 1.5 to 1.7 times), which involves greater trouble in cake incineration. Another problem is that both the filtrate and the filter cake may contain toxic residues, which require subsequent treatment for neutralization and toxicity elimination. A further problem is that the modified sludge still involves filtration difficulty and the resulting filter cake does not fully meet the required level of dewatering.

In contrast, the latter mentioned method of modifying the sludge prior to dewatering, i.e., the electrolytic treatment method, has an advantage that it requires no or little, if any, use of chemicals or filter aids and, therefore, it involves no such problem as above mentioned, insofar as it can be carried out satisfactorily or effectively.

This method of modifying the sludge by electrolytic treatment is an application of the principle that when electricity is applied to a concentrated sludge in an electrolytic tank, ions in the sludge are caused to migrate so that less filterable suspended matter and dissolved substances in the sludge are electrically decomposed, there being thus repetition of oxidation, reduction, neutralization, and deposition stages with respect to the so decomposed matter, with the result that flocs in the sludge are rendered more hydrophobic than in the case where aforesaid chemical agents are used so that the flocs are modified into easy-to-filter flocs. However, known methods and apparatuses for sludge modification by electrolytic treatment have problems yet to be solved as discussed below. Attempts to solve those problems have not yet gone beyond the stage of experiment, and in reality there is as yet no apparatus based on such attempt that has been put in practical application at any sewage treatment plant or elsewhere.

According to series of experiments conducted, with the prior art method for sludge modification by electrolytic treatment, where the positive and negative electrode plates arranged in the electrolytic tank are spaced as narrowly as possible relative to one another, higher electrolysis or modification efficiency is obtainable, but if the distance between adjacent electrode plates is excessively small, gas bubbles, such as oxygen and hydrogen, generated from individual electrode plates and hardened flocs as a result of electrolysis of the sludge are likely to be retained between the electrode plates. When such bubbles and/or inclusions, e.g., hardened flocs, are retained between electrode plates, the trouble is that they interfere with electric current conduction, so that the electrolysis or modification efficiency will be lowered to the extent that the electrolytic treatment method for sludge modification is far from being put to practical use. However, if the inter-electrode space is made wider, a decrease in current density is inevitable and electrolytic operation requires considerable time, though gas bubbles and inclusions produced between individual electrode plates can be prevented from being retained between and depositing on the electrode plates; in this case, too, therefore, it is inevitable that the electrolysis or modification efficiency is lowered to the extent that the sludge modification method can hardly be put to practical use.

Techniques intended to solve aforesaid problems in the case where space intervals between individual electrodes are reduced, that is, methods and apparatuses for removal of inclusions produced between the electrode plates, are described in the following publications, for example. Japanese Patent Publication No. 16351/1979 discloses a method and apparatus wherein a solution (of caustic soda) capable of eluting inclusions formed between surfaces of individual electrode plates in an electrolytic tank, which solution is contained in an eluting solution tank, is intermittently circulated between the electrolytic tank and the eluting solution tank, whereby the inclusions formed between the electrode plates can be removed. Japanese Patent Laid Open Publication No. 129199/1987 discloses a method and apparatus wherein sludge in an electrolytic tank is agitated by an agitation blade provided below electrode plates in the electrolytic tank so that a downcurrent is produced of the sludge, a portion of the sludge being drawn from the bottom of the tank, the so drawn sludge being sprinkled into the tank from a level above the electrode plates so that a downcurrent of sludge is produced which flows downward between individual electrode plates arranged in side by side relation and along the surfaces of the electrode plates, so that inclusions formed between individual electrode plates can be carried away by a combination of the first and second mentioned downcurrents.

However, the first mentioned method and apparatus wherein the eluting solution is circulated between the electrolytic tank and the eluting solution tank is not directed to removal of inclusions in the course of electrolytic sludge treatment. As such, the difficulty with this technique is that operation has to be interrupted in the course of electrolytic sludge treatment. The second mentioned method and apparatus wherein downcurrents of sludge are produced in the electrolytic tank is such that the sludge is caused to flow downward against the upward orienting force of gas bubbles produced from the electrode plates. Therefore, this latter technique involves a problem that if the sludge is vigorously agitated by the agitation blade in order to provide a uniform and sufficient downcurrent flowing between individual electrode plates, flocs of modified sludge are broken down by the agitation blade, and another problem that unless a uniform and sufficient downcurrent is produced between individual electrode plates, gas bubbles and inclusions formed between the electrode plates cannot smoothly be removed.

SUMMARY OF THE INVENTION

Object of the Invention

The object of the present invention is to provide a method and apparatus for electrolytic treatment of sludge which can easily modify sludge prior to the stage of filtration into a sludge capable of being readily dewatered by a high-pressure dehydrator, such as a filter press, without use of flocculants in large quantities and without use of filter aids, and which incorporates improvements to aforesaid electrolytic sludge treatment method and apparatus so that when the sludge prior to being filtered for dewatering is electrolytically treated, gas bubbles and inclusions produced between individual electrode plates can be removed continuously and smoothly, the sludge being thus efficiently modified.

Means for Solving the Problems

Accordingly, this invention provides a method for electrolytic treatment of sludge wherein the sludge is eletrolytically treated in an electrolytic tank equipped with a multiplicity of electrode plates, anodic and cathodic, in which the anodic and cathodic plates are alternately arranged side by side at short intervals in a row, characterized in that a circulating current of the sludge being treated is caused to be produced within said electrolytic tank, said circulating current including an upward current flowing upward between individual electrode plates and a surface current flowing above the row of the electrode plates and near the surface level of the sludge in a specified direction, so that gas bubbles produced between the individual electrode plates and flocs present between the electrode plates are removed from their inter-plate locations and carried to the surface of the tank by said upward current, the surfaced bubbles and flocs being then carried by said surface current to a location which is generally outside the surface area above the electrode plates, and in that sludge is sprinkled over the bubbles carried to said location to beat out the bubbles, and an apparatus for electrolytic treatment of sludge including an electrolytic tank equipped with a multiplicity of electrode plates, anodic and cathodic, in which the anodic and cathodic plates are alternately arranged side by side at short intervals in a row, sludge fluidizing means mounted to the electrolytic tank for causing the sludge being treated in the tank to flow along the surfaces of the electrode plates, and sludge sprinkling means mounted to the tank for sprinkling sludge over gas bubbles carried up to the surface level of the sludge being treated to beat them out, characterized in that said sludge fluidizing means comprises sludge circulating pump means having a suction port opening at a position adjacent and under the surface level of the sludge in the tank and a discharge port opening in the tank at a position adjacent the bottom of the tank, said suction and discharge ports being open at one side of the row of the electrode plates and over full width of said row to cause a circulating current of sludge to be produced within the tank including an upward current flowing upward along the surfaces of the electrode plates, and in that said sludge sprinkling means has a discharge port for sprinkling sludge over the surface level of the sludge generally above the suction port of said sludge circulating pump means, said discharge port being open over almost full width of the suction port of said circulating pump means.

Function

The foregoing technical means function in the following way.

When the sludge to be treated is introduced into the electrolytic tank and then the electrode plates are energized, ions migrate in the sludge so that less filterable suspended matter and dissolved substances in the sludge are electrically decomposed, and the process of oxidation, reduction, neutralization, and deposition is repeated with respect to the decomposed matter, whereby the less filterable matter of hydrophilic nature in the sludge is modified into fiterable matter of hydrophobic nature. Since the individual electrode plates arranged in the electrolytic tank are narrowly spaced, gas bubbles, such as oxygen and hydrogen, produced as a result of electrolysis of the sludge may tend to stay between the individual electrode plates, and further as a result of electrolysis, electrolyzed matter, such as hardened flocs, may tend to deposit on the surfaces of and between individual electrode plates. In the electrolytic tank in accordance with the method and apparatus of the invention, however, there is produced a circulating current in the sludge being treated, including an upcurrent flowing upward between individual electrode plates and a surface current flowing near the surface level of the sludge and above the row of electrodes in a predetermined direction; therefore, gas bubbles formed between the individual electrode plates and flocs present between the electrode plates are normally removed first by the upcurrent from between the electrode plates and carried upward accordingly.

Therefore, the surface of each electrode plate is constantly protected by such upward current from deposition of electrolyzed matter thereon, and the so protected surface of the plate is constantly made ready for contact by unmodified particulate matter present in the sludge being treated. In view of the fact that chemical reaction efficiency on the surface of electrodes in an electrolytic apparatus like the one of this invention depends largely on the extent to which the surface of electrodes can be kept fresh for ready contact by unelectrolyzed particulate matter present in the sludge, this means that the method and apparatus of the invention can accomplish very efficient electrolytic treatment of sludge.

Gas bubbles and floc thus carried upward from the gaps between the electrode plates are then carried by the surface current flowing above the row of electrode plates in the predetermined direction, to a location virtually off the area above the electrode plates, at which location sludge is sprinkled from a sludge sprinkling device so that the gas bubbles and flocs carried to said location are beaten by sludge sprinkled thereon, the bubbles being thereby eliminated.

Therefore, according to the method and apparatus of the invention, gas bubbles carried by the upcurrent to the surface of the electrolytic tank will never flow over the edge of the tank. According to the method and apparatus of the invention, therefore, the sludge to be treated is fed into the tank at one side and treated sludge is removed from the tank at the other side, it being thus possible to carry out electrolytic treatment of sludge continuously.

The sludge caused to flow along the surface to a location virtually off the area above the row of electrode plates is then caused to flow downward from said location until it reaches a position below the row of electrode plates, from which the sludge is again carried upward between the electrode plates. Accordingly, gas bubbles which have escaped from being eliminated by the sludge sprinkled on them, and modified flocs are caused to flow downward along with the circulating current of sludge to said position below the electrode plates and are then allowed to flow upward again between the electrode plates, while unmodified flocs are subjected to electrolysis during their passage through the gaps between individual electrode plates and thus modified.

Modified sludge can be removed from the electrolytic tank either continuously or on a batch basis.

In the electrolytic treatment apparatus of the invention, the sludge fluidizing means for causing the sludge to flow along the surface of electrode plates in the electrolytic tank has a suction port open at a position adjacent and under the surface level of sludge in the tank and a discharge port open in the tank at a position near the tank bottom, the suction and discharge ports being open at one side of the row of electrode plates and over full width of said row. By virtue of this arrangement there can be produced a circulating current of sludge including an upcurrent flowing upward evenly between the electrode plates and a traverse current flowing smoothly above the row of electrode plates and in parallel to the electrode plates toward said suction port.

Therefore, gas bubbles produced in the gaps between individual electrode plates are caused by this circulating current to flow upward very smoothly between the electrode plates, being then carried along a path above the electrode plates toward a position above the suction port.

At said position above the suction port toward which gas bubbles are directed there is open a discharge port of the sludge sprinkling means over full width of the suction port. Therefore, air bubbles thus collected at one side of the electrolytic tank are beaten out by a shower of sludge falling thereon. In the vicinity of said suction port the flow rate of the circulating current of sludge is greater than elsewhere; therefore, if a shower of sludge released from the sprinkling means happens to fall on any electrode plates, air bubbles, carried away from the plates to the surface, will never be forced back into a gap between electrodes to cause jamming. Bubbles which remain uneliminated are refluxed from the suction port to the bottom of the tank.

DESCRIPTION OF THE PREFERRED EMBODIMENT

Figure 1:
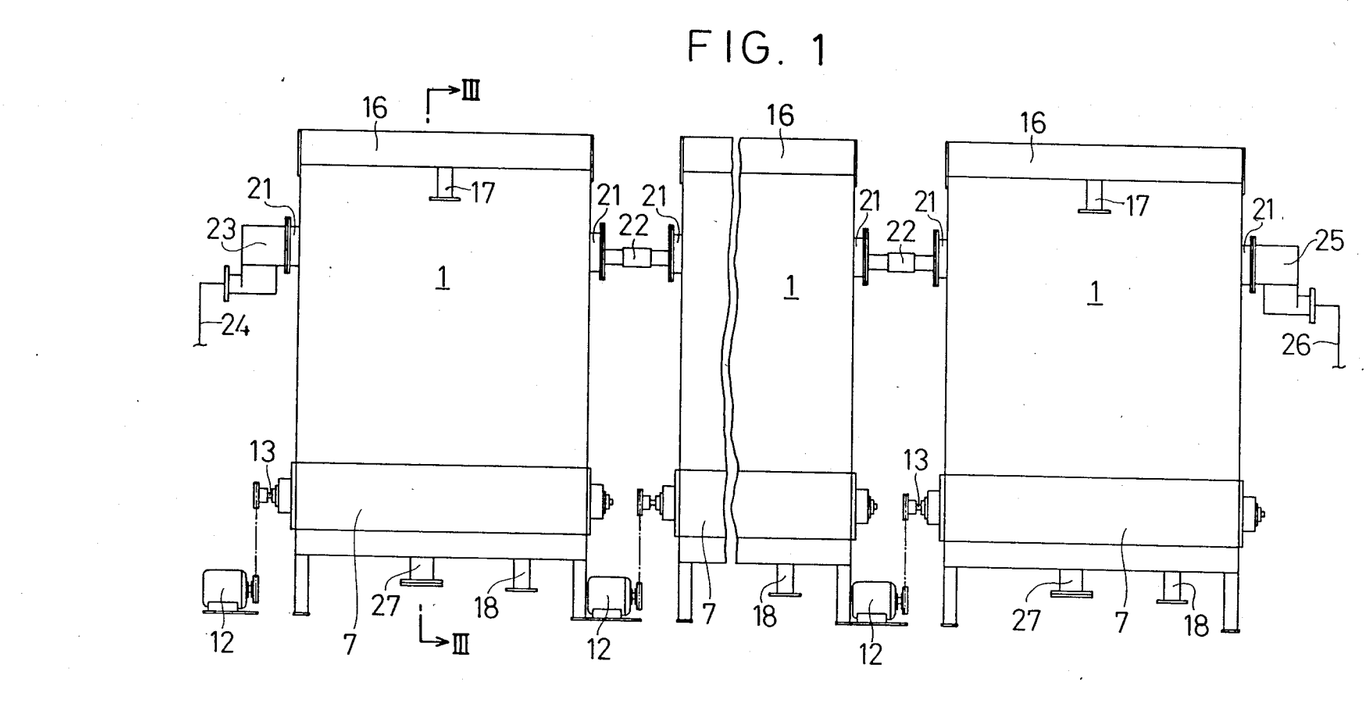
FIG. 1 is a front view showing one embodiment of the electrolytic sludge treatment apparatus in accordance with the invention.
Figure 2:
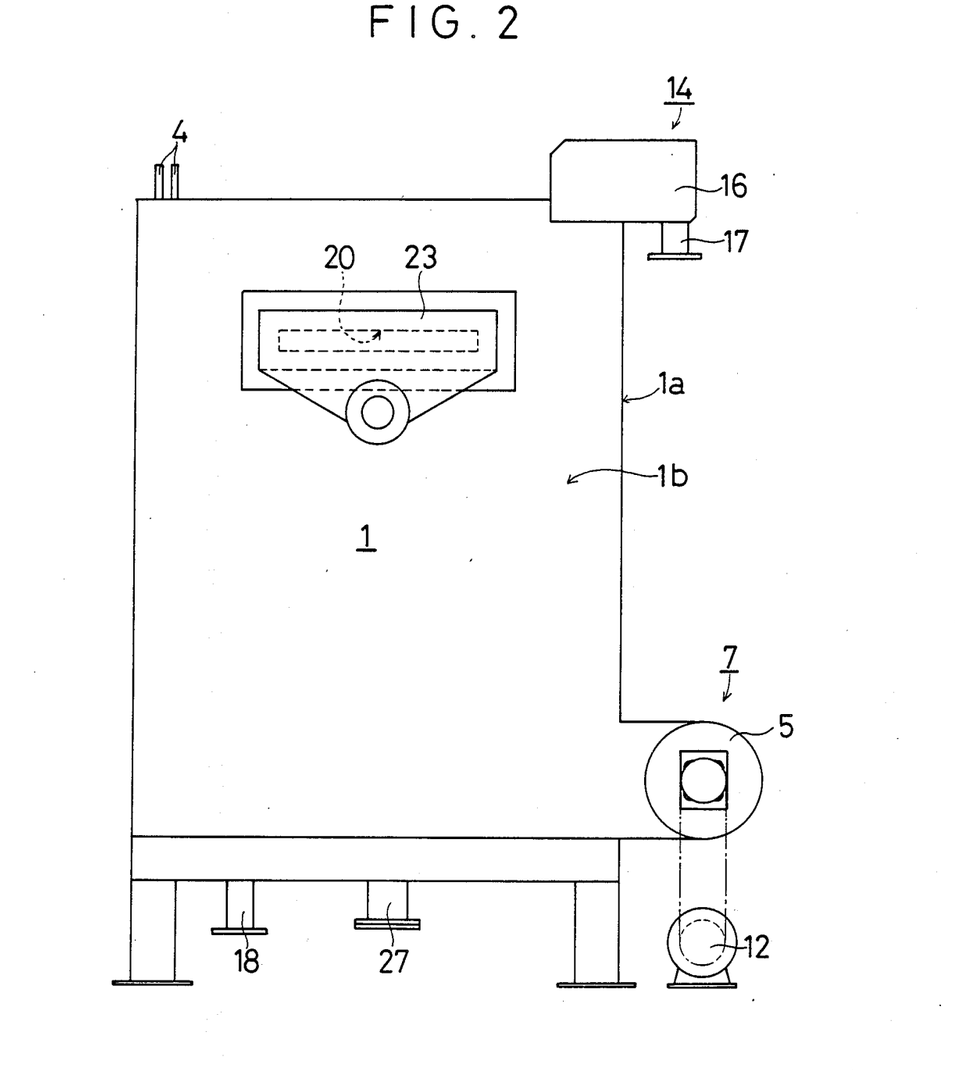
FIG. 2 is a left side view of same.

The method and apparatus of the invention will now be described in further detail with reference to FIGS. 1 to 5 which illustrate one embodiment of the invention. As shown in FIG. 1, the embodiment relates to the case where three electrolytic tanks 1 are connected in series, each tank 1 being of the following arrangement.

Figure 3:
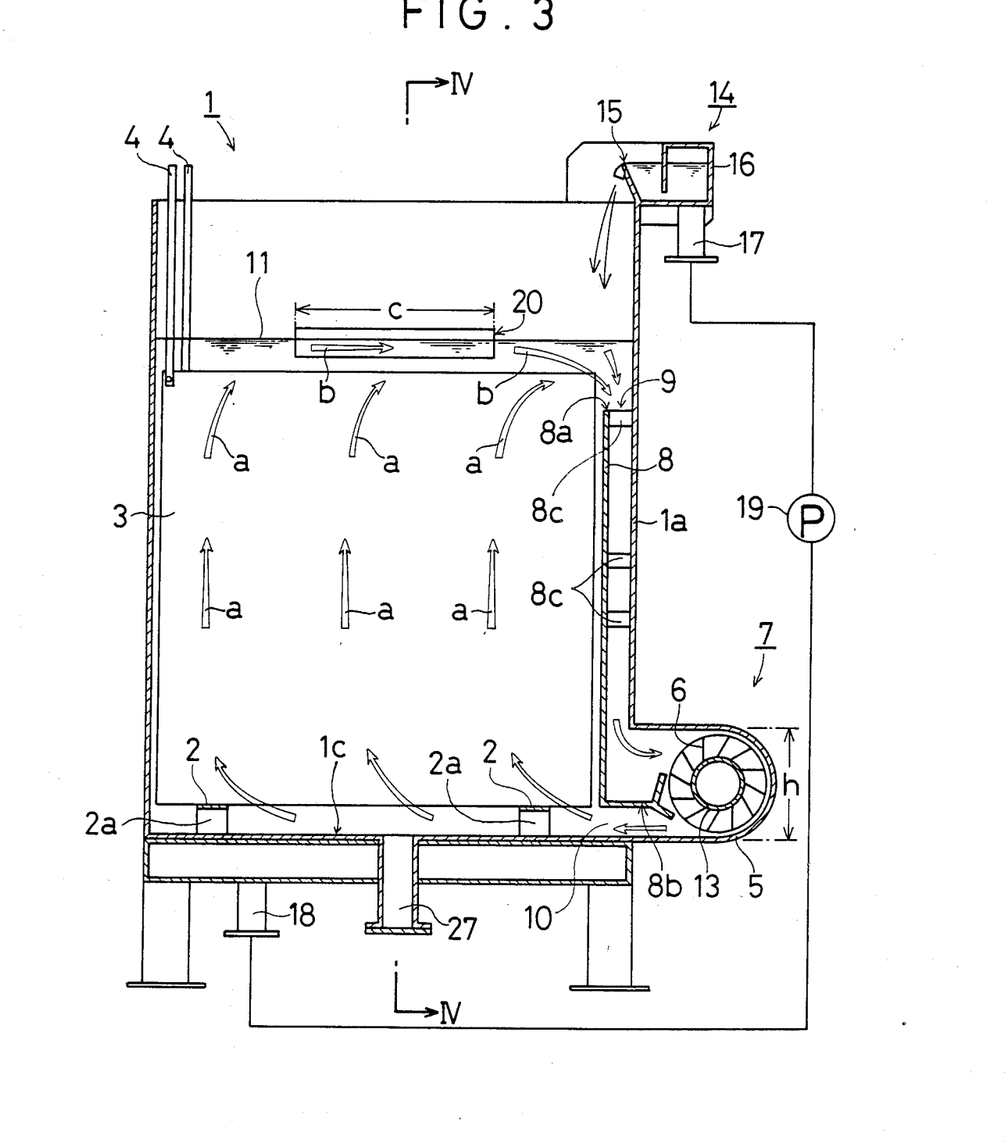
FIG. 3 is a longitudinal sectional side view of an electrolytic tank of the invention (section taken along line III—III in FIG. 1)
Figure 4:
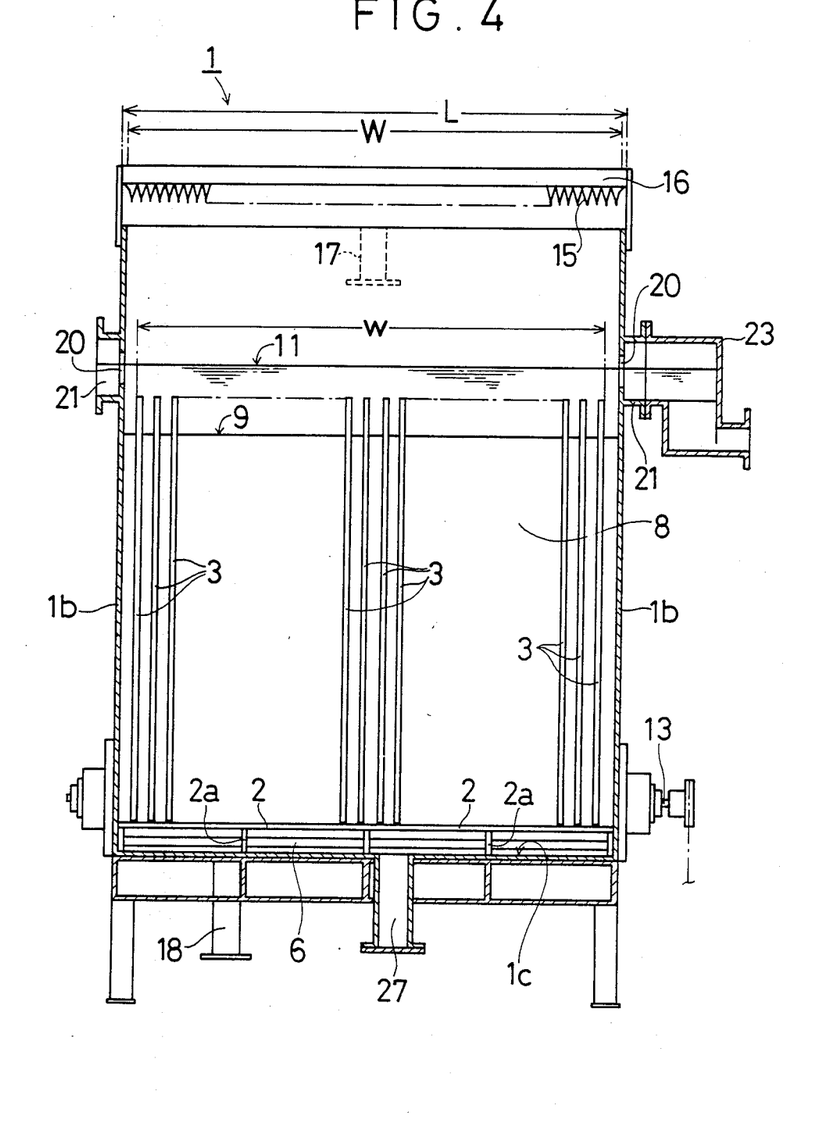
FIG. 4 is a longitudinal sectional rear view of same (section taken along IV—IV in FIG. 3)
Figure 5:
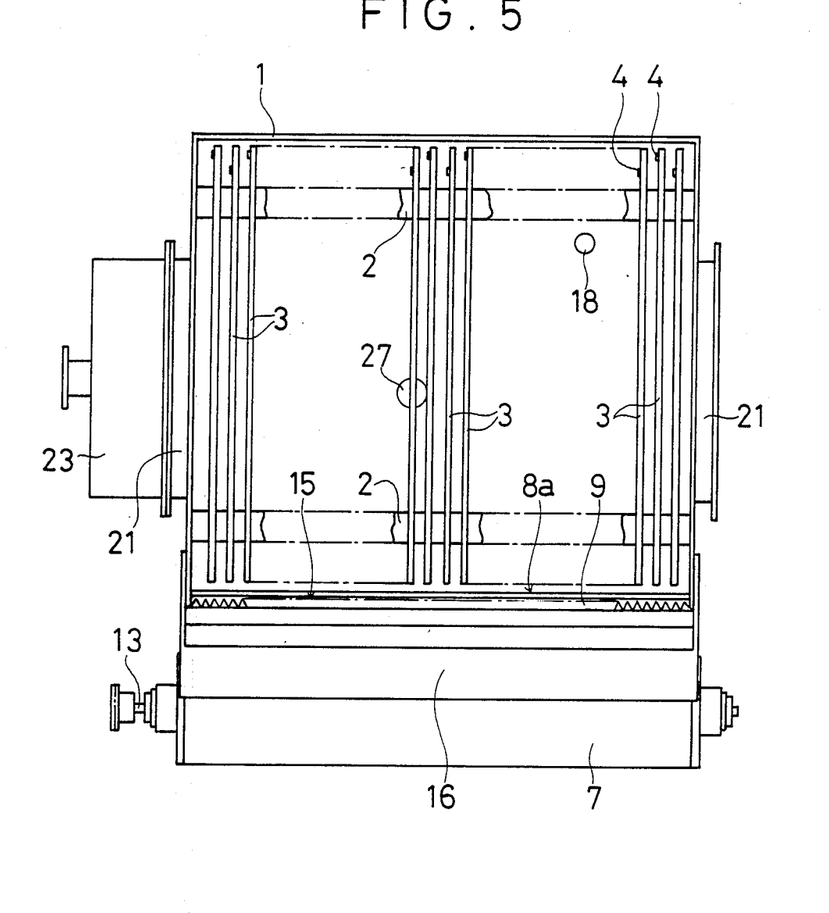
FIG. 5 is a plan view of same.

As can be seen from FIGS. 3 and 4, in the electrolytic tank 1 there are placed two electrode bearers 2 extending transversely of the tank 1 and spaced from the bottom 1c of the tank 1. Shown by 2a is a support leg for each bearer 2. A multiplicity of electrode plates 3, anodic and cathodic, which are parallel to side walls 1b of the tank 1, are arranged at given intervals, e.g., 15 mm, and in parallel relation to one another on the electrode bearers 2 in the tank 1, the anodic and cathodic plates being alternately disposed. The rows of electrode plates 3 are held at a predetermined distance from the tank bottom 1c by means of said bearers 2.

For the material of the electrode plates 3, the anodic plates are made of iron and the cathodic plates are made of stainless steel. A copper bar 4 is secured to each electrode plate 3 for connection purposes, the plate 3 being connected to a power supply having a voltage of the order of 1.5 to 20 V through a cable (not shown) connected to the copper bar 4.

A front wall 1a of the electrolytic tank 1 has a portion of a certain height h above the tank bottom 1c which is cut away over full width W of the front wall 1a. A pump device 7 for sludge circulation is mounted to the cut-away portion of the front wall 1a, the pump device 7 consisting of a pump casing 5 mounted so as to close the cut-away portion and an impeller 6 horizontally mounted in the pump casing 5. The impeller 6 has a width almost equal to full width W of the tank 1. At the front side (right-hand side in FIG. 3) of the row of electrode plates 3 in the electrolytic tank 1 there is mounted a partition plate 8 having an L-shaped longitudinal sectional side configuration which is suitably spaced from the front wall 1a of the tank 1 and from the tank bottom 1c, said partition plate 8 defining a virtual suction port 9 in the form of a gap between its upper edge 8a and the front wall 1a of the tank 1 for said sludge circulation pump device 7 which opens in the electrolytic tank 1, and also defining a virtual discharge port 10 in the form of a gap between its lower end surface 8b and the tank bottom 1c for said sludge circulation pump device 7 in the tank 1. Shown by 8c is a support leg for the partition plate 8. The suction port 9 is open under the surface level 11 of the sludge at a position adjacent thereto in front of the electrode plates 3 and over full width w of the row of electrode plates 3, while the discharge port 10 is open at a position adjacent the tank bottom 1c in front of the electrode plates 3 and over full width w of the row of electrode plates 3, said discharge port 10 facing the underside of said row of electrode plates 3. Shown by 12 is a motor with a reduction gear for driving a shaft 13 of the pump device 7.

Nextly, the arrangement of a sludge sprinkling device 14 will be described. On the top of the front wall 1a of the electrolytic tank 1 there is installed an overflow gutter 16 having a length L extending over the full width W of the front wall 1a and having an overflow port 15 extending over its full length L. The overflow gutter 16 has a port 17 connected to a discharge port of a sludge sprinkling pump unit 19 which has its suction port connected to a port 18 provided at a suitable location in the bottom 1c of the electrolytic tank 1, so that when the sludge sprinkling pump unit 19 is driven, sludge pumped up from the tank 1 is supplied into the overflow gutter 16 over the entire length L thereof, being then sprinkled from the overflow port 15 toward the sludge in the tank 1. The overflow gutter 16 is mounted on the top of the electrolytic tank 1 so that the sludge sprinkled from the overflow port 15 is directed to the surface level 11 generally above the suction port 9 of the sludge circulation pump device 7.

Side walls 1b, right and left, of each electrolytic tank 1 are each formed with a horizontally elongate sludge inlet/outlet port 20 which is open at about same level as the upper edge of the electrode plates 3 in the tank. A mount fitting 21 is fixed to the inlet/outlet port 20 for connecting a sludge supply/discharge circuit to the tank 1 (see FIG. 1). Individual tanks 1 connected in series have their sludge inlet/outlet ports 20 connected at 22 through said fitting 21. As shown, a supply circuit 24 for untreated sludge is connected to the left-side sludge inlet/outlet port 20 of the tank 1 at the left through a sludge supply fitting 23 coupled to the corresponding mount fitting 21, while a discharge circuit 26 for treated sludge is connected to the right-side sludge inlet/outlet port 20 of the tank 1 at the right end through a sludge discharge fitting 25 coupled to the corresponding mount fitting 21. The sludge supply fitting 23 and the sludge discharge fitting 25 are of same construction.

With the electrolytic treatment apparatus of the present embodiment arranged as above described, as sludge is supplied into the leftmost electrolytic tank 1, the sludge is sequentially allowed to flow into individual tanks 1 through the sludge inlet/outlet ports 20 by which the tanks 1 are connected in series, and meanwhile the sludge is treated in each tank 1 in manner as described below.

When the sludge circulation pump device 7 and the sludge sprinkling pump unit 17 are driven, a circulating current of sludge is produced in each electrolytic tank 1 over full width W of the tank 1, said current including an upward current (arrow a in FIG. 3) flowing upward between the individual electrode plates 3 and along the surfaces thereof, and a surface current (arrow b in FIG. 3) flowing above the electrode plates 3 along a plane parallel to the surfaces thereof and toward the front wall 1a of the tank 1. This circulating current of sludge is accelerated by falling thereon of a sludge that is pumped up from the bottom 1c of the electrolytic tank 1 and sprinkled from the overflow port 15 of the overflow gutter 16 onto the liquid surface 11 above the suction port 9 and over the full width W of the tank.

Therefore, in the electrolytic tank 1 in which such circulating current of sludge is generated over the full width W of the tank, when the electrode plates 3 are energized to electrolyze the sludge, gas bubbles produced between the electrode plates 3, along with flocs present between the plates 3, are carried upward by aforesaid upward current to a level above the row of electrode plates 3 and are then carried to a position above the suction port 9 of the sludge circulation pump device 7 by a surface current of sludge flowing above said row and along a plane parallel to the surfaces of the plates 3, the bubbles being then beaten out by a shower of sludge sprinkled thereon from said overflow port 15. Any bubbles which have remained uneliminated are carried along with flocs by the circulating current of sludge to a level below the row of electrode plates 3, wherefrom the bubbles and flocs are caused to flow upward between the electrodes and then to flow above the electrode plates 3 until they again reach the position under the overflow port 15, where they are beaten and eliminated. Therefore, the amount of gas bubbles carried to the liquid surface of the tank 1 is kept about constant at all times, there being no possible accumulation of bubbles in excess of said constant level.

In this way, gas bubbles generated between individual electrode plates 3 in the electrolytic tank 1 are constantly and steadily removed from the surfaces of the plates 3 by an upward current of sludge flowing upward between the plates 3; therefore, the surfaces of the plates 3 are constantly kept fresh. Accordingly, the sludge flowing in circulation along a plane parallel to the surfaces of the electrode plates 3 can be modified very efficiently and uniformly.

In the drawings, numeral 27 designates a sludge withdrawal port provided at the bottom of the electrolytic tank 1. Where each electrolytic tank 1 is employed as a batch-wise electrolytic treatment apparatus, a supply pipe (not shown) for sludge to be treated should be connected to aforesaid inlet/outlet port 20, an electrolyzed sludge removal pipe (not shown) being connected to the sludge withdrawal port 27 at the tank bottom. Where the electrolytic tank 1 is employed as a continuous type electrolytic treatment apparatus, one of the inlet/outlet port 20 should be connected to a supply circuit for the sludge to be treated (not shown), the other inlet/outlet port 20 being connected to a discharge circuit for electrlyzed sludge (not shown). If a plurality of electrolytic tanks 1 are connected in series for use as such continuous type (continuously operable) electrolytic treatment apparatus as illustrated in FIG. 1, the tanks 1 should be connected together at aforesaid inlet/outlet ports 20.

In the electrolytic tank 1 of the present embodiment, the inlet/outlet ports 20 are each formed at a location adjacent the top portion of the row of electrode plates 3 at one end in the tank so that sludge is supplied through one of the inlet/outlet ports 20 toward upper edges of adjacent electrode plates 3 when it is fed through the port 20 into the tank 1, said port 20 having a certain width c as shown.

In the above described embodiment, three electrolytic tanks 1 are connected in series so that when sludge is continuously supplied in appropriate quantities into the leftmost tank 1, the sludge is sequentially passed into the other tanks 1 and in the process of this movement the sludge is repeatedly electrolyzed in each individual tank 1, whereafter electrolyzed sludge is continuously discharged from the rightmost tank 1. If the sludge is such that it can be electrolyzed in rather short time, a plurality of electrolytic tanks 1 may be connected in parallel (not shown). In another embodiment (not shown), sludge may be supplied into and discharged from each electrolytic tank 1 on a batch basis so that electrolytic sludge treatment is carried out batchwise, for which purpose the sludge removal port 27 at the bottom of the tank can be conveniently employed.

ADVANTAGES OF THE INVENTION

In the method and apparatus for electrolytic treatment of sludge in accordance with the invention, as described above, the fluidizing means for causing untreated sludge to flow along the surfaces of the electrode plates in the electrolytic tank comprises a sludge circulation pump device having a suction port opening at a position adjacent but under the surface level of the sludge and a discharge port opening into the tank at a position adjacent the bottom of the tank, said suction and discharge ports being open at one side of the row of electrode plates and over full width of said row in order to allow a circulating current to be produced of the sludge including an upward current flowing along the surfaces of the electrode plates in the tank; therefore, the sludges subjected to electrolytic action of the electrode plates in the tank and between the electrode plates should necessarily pass through said suction port at a position adjacent the liquid surface level.

Accordingly, gas bubbles electrolytically produced between the electrode plates, and flocs present along with the bubbles between the electrode plates are carried upward by the circulating current, or more specifically an upward current of the sludge being treated which is flowing upward between the electrode plates, to a level above the row of electrode plates, and the so surfaced gas bubbles are gathered at the predetermined position in the tank by a surface current flowing above the row of electrode plates in the predetermined direction. That is, the gas bubbles are gathered at a location above the position at which the suction port of the sludge circulation pump device is open. Above the area over which the suction port is open there is installed a sludge sprinkling device capable of sprinkling sludge toward the liquid surface above suction port and over almost full width of the suction port. Therefore, the gas bubbles gathered at said position are beaten at same position by a shower of sludge and are thus eliminated. Any gas bubbles which have remained uneliminated are again carried by the circulating current of sludge to same location and are subjected to action of such sludge shower. As such, even where electrolytic treatment of sludge is carried out for long time, there is no possibility of gas bubble accumulation in the tank in excess of a certain limit.

Therefore, with the method and apparatus for electrolytic sludge treatment according to the invention, it is possible to efficiently carry out continuous operation of electrolytic treatment for long time.

Furthermore, since gas bubbles and flocs produced between the electrode plates are carried away from the surfaces of the electrode plates by the upward current flowing constantly between the plates, the surfaces of the electrode plates are constantly kept fresh so that untreated particles of sludge are allowed to go into contact with the fresh plate surfaces. Therefore, the method and apparatus for electrolytic treatment of sludge according to the invention enable efficient electrolytic treatment of sludge for modification of the sludge into a hydrophobic sludge so that the method and apparatus can be advantageously employed in a sewage treatment plant or the like facility.

What is claimed is:

1. A method for electrolytic treatment of sludge wherein the sludge is electrolytically treated in an electrolytic tank equipped with a multiplicity of electrode plates, anodic and cathodic, in which the anodic and cathodic plates are alternatively arranged side-by-side at short intervals in a row, said method comprising the steps of:

supplying sludge into said electrolytic tank through a sludge inlet port formed in one side wall of the tank which is parallel to the electrode plates;

producing a circulating current of the sludge being treated within said electrolytic tank, said circulating current including an upward current flowing upward between individual electrode plates, a surface current flowing above the row of electroplates in the tank and near the surface level of the sludge along the top edges of the electroplates, in a specified direction, a downward current flowing downward within the tank and along one side of the row of the electroplates, and a bottom current flowing under the row of the electroplates in the tank and along the lower edges of the electroplates in a direction opposite to the direction of the surface current, so that gas bubbles produced between the individual electroplates and flocs present between the electroplates are removed from their inter-plate locations and carried to the surface of the tank by said upward current, the surfaced bubbles and flocs being then carried by said surface current to a location which is outside the surface area above the electrode plates;

sprinkling sludge over the bubbles carried to said location to knock down and dissolve the bubbles; and withdrawing the sludge electrolytically treated within the tank from the tank through a sludge outlet port formed in another side wall of the tank which is parallel to the electroplates.

2. A method for electrolytic treatment of sludge as set forth in claim 1 wherein said sludge sprinkled over the bubbles is a sludge pumped up from the electrolytic tank.

3. An apparatus for electrolytic treatment of sludge comprising:

an electrolytic tank equipped with a multiplicity of electrode plates, anodic and cathodic, in which the anodic and cathodic plates are alternately arranged side-by-side at short intervals in a row;

sludge fluidizing means mounted to the electrolytic tank for causing the sludge being treated in the tank to flow along the surfaces of the electroplates; and sludge sprinkling means mounted to the tank for sprinkling sludge over gas bubbles carried up to the surface level of the sludge being treated to knock down and dissolve them;

said electrolytic tank having a pair of sludge inlet/outlet ports formed in side walls, right and left, of said tank which are parallel to said electrode plates;

said sludge fluidizing means including sludge circulating pump means having a suction port opening at a position adjacent and under the surface level of the sludge in the tank and a discharge port opening in the tank at a position adjacent the bottom of the tank, said suction and discharge ports being open at one side of the row of the electrode plates and over full width of said row to produce a circulating current of sludge within the tank including an upward current flowing upward along the surfaces of the electrode plates;

said sludge circulating pump means including a pump casing mounted to the wall of the tank at one side of the row of the electrode plates and having a width generally co-extensive with the width of the wall, and an impeller rotatably supported in said pump casing, suction and discharge ports of said sludge circulating pump means within the electrolytic tank being defined by a partition plate mounted in the tank;

said sludge sprinkling means having a discharge port for sprinkling sludge over the surface level of the sludge generally above the suction port of said sludge circulating pump means, said discharge port being open over almost full width of the suction port of said circulating pump means.

4. An apparatus for electrolytic treatment of sludge as set forth in claim 3 wherein said sludge sprinkling means comprises an overflow gutter disposed above the electrolytic tank at one side thereof and having an overflow opening over its full length, and sludge sprinkling pump means having a suction port connected to a predetermined position in the tank and a discharge port connected to said overflow gutter.

* * * * *